(No Model.)

W. H. MASTERMAN.
CAR WHEEL.

No. 362,292. Patented May 3, 1887.

Witnesses,
Geo. H. Strong

Inventor,
W. H. Masterman
By Dewey & Co.
atty

UNITED STATES PATENT OFFICE.

WILLIAM H. MASTERMAN, OF SAN FRANCISCO, CALIFORNIA.

CAR-WHEEL.

SPECIFICATION forming part of Letters Patent No. 362,292, dated May 3, 1887.

Application filed January 13, 1887. Serial No. 224,298. (No model.)

*To all whom it may concern:*

Be it known that I, WILLIAM H. MASTERMAN, of the city and county of San Francisco, State of California, have invented an Improvement in Car-Wheels; and I hereby declare the following to be a full, clear, and exact description of the same.

My invention relates to an improvement in car wheels and axles for the purpose of relieving the friction and strain which occur where both wheels are rigidly secured to the opposite ends of a single axle for railway cars or carriages.

It consists in forming a journal upon one end of the axle separate from and independent of the journal which turns in the boxes, and in fitting one wheel to this supplemental journal so that it may turn slightly in passing curves or other points where necessary.

Figure 1:
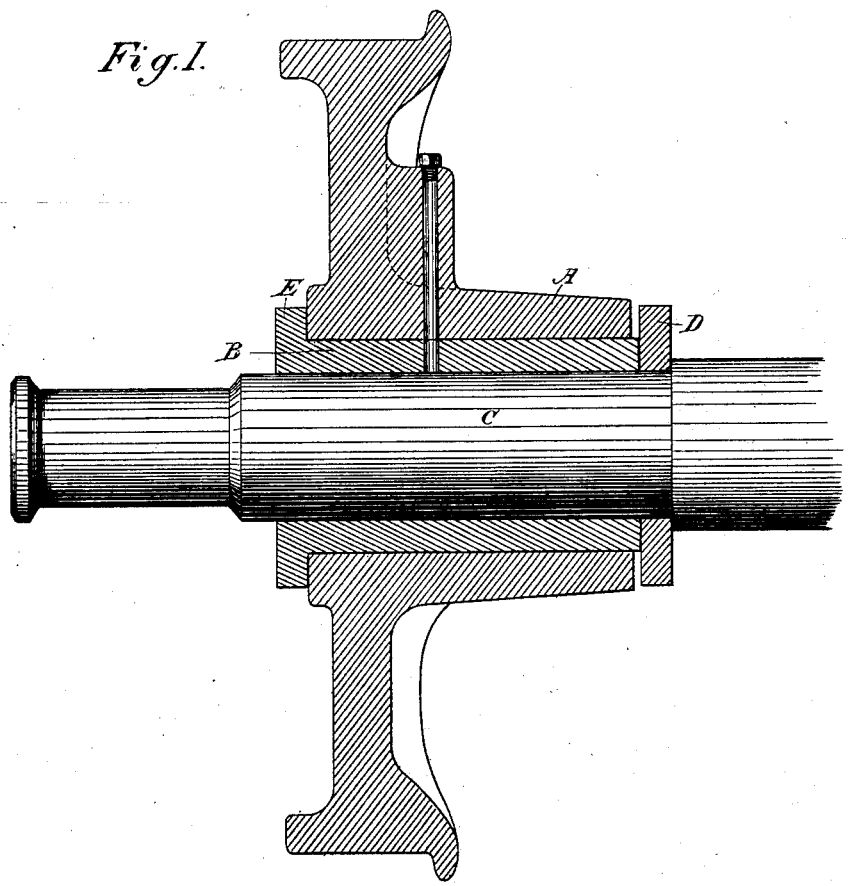
Figure 2:
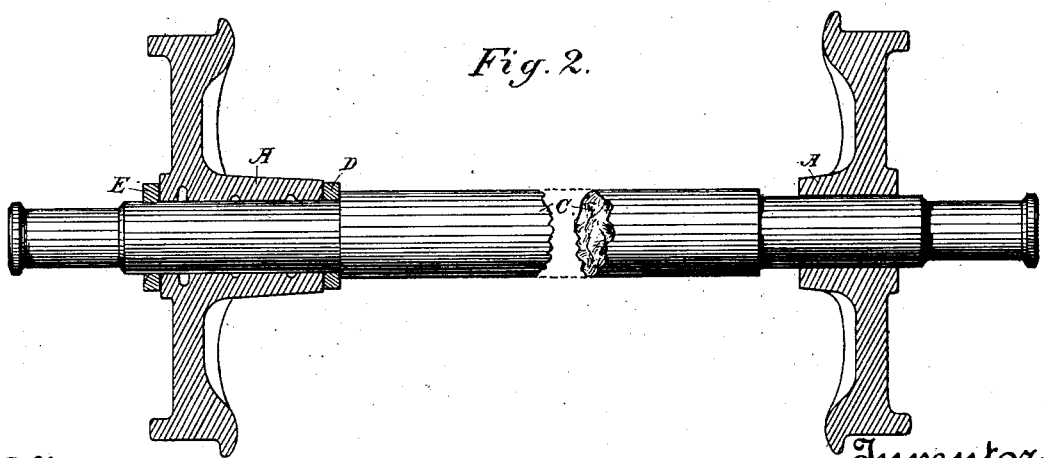

Referring to the accompanying drawings for a more complete explanation of my invention, Figure 1 is a view showing one end of a car-axle with the wheel attached. Fig. 2 is a modification of the device.

A is the wheel-hub, the web or flange of which may be of the usual construction. This hub is made of considerable length, and is bored out so as to fit and turn upon a sleeve, B, which is secured to the end of the axle where the wheel is usually fixed upon the axle. This sleeve is made to fit tight upon the axle C, being forced on by hydraulic pressure or otherwise, and the car-wheel is bored out so that it will turn sufficiently easily upon the exterior of the sleeve.

D is a collar which is placed upon the axle inside the inner end of the sleeve B, and may be forced on at the same time when the sleeve and wheel are put on until it abuts against the shoulder made at the inner end of this portion of the axle. The outer collar, E, is formed with the sleeve, and the sleeve is first slipped into the wheel-hub, after which the sleeve and wheel are forced upon the axle by hydraulic or other pressure, and are as securely fixed as the ordinary wheels. A small space is left between the ends of the hub and the inner collars, so that the wheel has sufficient play or freedom to move slightly in turning curves, or when one wheel is worn smaller than the other, when there is a tendency for one wheel to turn faster than the other.

The rigid wheel insures the turning of the axle. If desired, the sleeve may be dispensed with, as shown in Fig. 2, and the wheel fitted directly upon the axle itself between two collars, the operation being the same as previously described; but with the sleeve what wear takes place will be upon the sleeve, the axle will always be preserved without wear, and the wheel will be as firmly secured to the axle as if fixed directly to it. The wheel and the sleeve may be easily removed by ordinary process at any time, if necessary, without interfering with the axle, and when the wheel has been worn out upon the face it is easy to substitute another upon the same sleeve. But little lubrication will be needed between the wheel and the axle, and this may be supplied either by making grooves or channels inside the hub, which will hold the small quantity of lubricant, or by means of a hole bored through one side of the hub and a small reservoir or cup connected therewith, which may be supplied from time to time as needed.

The wheel upon the opposite end of the axle may be fitted tightly and forced on by hydraulic pressure or other usual manner. The wheel-hub A does not turn as easily upon its bearing as the axle turns in its journal-boxes, but on ordinary straight portions of the road, or where the wheels are of equal diameter, and where there is no strain, it will turn with the axle and the opposite wheel as if they were both rigidly fixed to the axle; but upon curves, or where from any reason there is a tendency for one wheel to run faster than the other on account of difference in friction, the wheel-hub A will turn slightly upon the sleeve or axle, thus relieving this strain and allowing the whole to run easily and smoothly.

Wheels mounted in this way will run the usual length of time for car-wheels, or about eighty thousand miles before the face is worn out, while the interior portion, which turns upon the axle or sleeve, will show no perceptible wear, and the binding and friction of turning curves will be very much relieved by this construction.

Having thus described my invention, what I claim as new, and desire to secure by Letters Patent, is—

1. The improvement in securing car-wheels to their axles, consisting of a sleeve having a collar formed upon its outer end and fitted to turn within the hub of one of the wheels, and a second collar upon the axle at the inner end of said sleeve and contiguous to the inner end of the hub, in combination with a wheel rigidly secured to the opposite end of the axle, substantially as herein specified.

2. In combination with a railway-car axle journaled to turn in boxes at its outer ends, and having the collar D, a supplemental journal or sleeve fitted to turn within the hub of one of the wheels, and having a retaining-collar formed upon its outer end, said sleeve being fixed upon the axle so as to rotate with it, and abutting against an inner collar fixed to the axle, and a wheel having a hub mounted on said sleeve and adapted to have a slight lateral movement thereon, substantially as herein described.

In witness whereof I have hereunto set my hand.

WILLIAM H. MASTERMAN.

Witnesses:
S. H. NOURSE,
H. C. LEE.